(12) United States Patent
Ishihara et al.

(10) Patent No.: US 6,178,377 B1
(45) Date of Patent: Jan. 23, 2001

(54) POSITIONAL INFORMATION PROVIDING SYSTEM AND APPARATUS

(75) Inventors: Fuminari Ishihara; Hiroyuki Kanemitsu, both of Susono (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/269,024

(22) PCT Filed: Sep. 10, 1997

(86) PCT No.: PCT/JP97/03185

§ 371 Date: Mar. 18, 1999

§ 102(e) Date: Mar. 18, 1999

(87) PCT Pub. No.: WO98/12688

PCT Pub. Date: Mar. 26, 1998

(30) Foreign Application Priority Data

Sep. 20, 1996 (JP) ................................. 8-249617
Jan. 24, 1997 (JP) ................................. 9-011308

(51) Int. Cl.⁷ ............................. G09B 29/00; G01C 21/00
(52) U.S. Cl. ........................... 701/200; 701/210; 340/995
(58) Field of Search ........................ 701/200, 201, 701/208, 209, 210, 212, 213; 340/998, 995

(56) References Cited

U.S. PATENT DOCUMENTS 6,047,280 * 4/2000 Ashby et al. ............................. 707/2
6,107,944 * 8/2000 Behr et al. ............................. 340/995

FOREIGN PATENT DOCUMENTS

| | | |
|---|---|---|
| 6-208698 | 7/1994 | (JP) . |
| 7-072234 | 3/1995 | (JP) . |
| 7-306865 | 11/1995 | (JP) . |
| 8-095488 | 4/1996 | (JP) . |
| 8-221697 | 8/1996 | (JP) . |
| 8-285613 | 11/1996 | (JP) . |
| 9-090869 | 4/1997 | (JP) . |
| 9-128683 | 5/1997 | (JP) . |
| 9-128690 | 5/1997 | (JP) . |

* cited by examiner

Primary Examiner—Tan Nguyen
(74) Attorney, Agent, or Firm—Pillsbury Madison & Sutro LLP

(57) ABSTRACT

When information regarding position of a facility, such as a parking lot, is requested from a terminal (22), an information center (10) supplies position information to the terminal (22) as a relative position using a landmark, such as a neighboring road. The terminal (22) computes a shift from a position of a landmark in a local map database (24) and a position of a received landmark in a map matching processor (34), and corrects the facility position. If the landmark has not been stored in the map database (24) at the terminal (22), relative data based on another road is resent.

12 Claims, 13 Drawing Sheets

| SECONDARY MESH NUMBER | LINK NUMBER | DISTANCE FROM STARTING POINT NODE | VECTOR (DIRECTION, DISTANCE) |
|---|---|---|---|

| ROAD TYPE | TYPE |
|---|---|
| EXPRESSWAY | 1 |
| NATIONAL HIGHWAY | 2 |
| PREFECTURAL ROAD, ORDINARY ROAD OF WIDTH 13 m OR WIDER | 3 |
| ORDINARY ROAD OF WITDTH 5.5 TO 13 m | 4 |
| ORDINARY ROAD OF WITDTH 3 TO 5.5 m | 5 |

| SECONDARY MESH CODE | LINK NUMBER | STARTING POINT NODE NUMBER, COORDINATE |
|---|---|---|
| END POINT NODE NUMBER, COORDINATE | NUMBER OF COMPLEMENTARY POINTS | COODINATE······ |

REPEAT FOR NUMBER OF COMPLEMENTARY POINTS

POSITIONAL INFORMATION PROVIDING SYSTEM AND APPARATUS

TECHNICAL FIELD

The present invention relates to a system for transmitting desired information to a terminal from an information center in response to a request from the terminal, and more particularly to a facility information provider system for providing information regarding a certain facility.

The present invention further relates to a position information provider system and a position information provider apparatus for recognizing absolute positions as position data relative to roads.

BACKGROUND ART

Heretofore, navigation apparatuses are known as apparatuses for route guidance in vehicles. These navigation devices basically function by continuously detecting a present position and displaying it on a map. They contain a GPS (global positioning system) apparatus for detecting the present position and a map database for storing map data. Furthermore, by entering a destination, the navigation apparatus searches for an optimum route from the present position and also guides the vehicle in a set travel route in the direction of movement at branch points.

Systems have also been proposed for connecting a mobile terminal, such as in a vehicle, with an information center, and obtaining information necessary in the vehicle. According to this type of system, restaurant information, sightseeing information, locations of usable parking lots, route guidance services to destinations, and so forth can be obtained as needed at the vehicle. The positions of and routes to restaurants, sightseeing spots, parking lots, and so forth can also be displayed on maps.

For example, a system is disclosed in Japanese Patent Laid-Open Publication No. Hei 7-72234 in which position information of a parking lot is returned as latitude and longitude data from an information center when information regarding the parking lot is requested from a terminal carried in a vehicle, and the position of the parking lot is displayed on a map contained in the terminal.

However, according to the apparatus of this publication, there is a problem where the displayed parking lot position based on the received latitude and longitude data is not a proper position on the map since the map contained in the terminal includes error. Namely, the origin material differs in creating the map or a certain amount of error is generated among a plurality of maps having different creation methods or precision. For this reason, a positional relationship with the peripheral condition (such as peripheral roads) of one point specified on one map may differ from a positional relationship with peripheral roads of the corresponding point on another map.

For example, even when a point specified by latitude and longitude is positioned on the right side of a road on one map, a situation may arise where it is indicated on the left side of the road on another map. Therefore, a situation may arise where the positional relationship with the peripheral roads may be incorrectly recognized at the vehicle, such as for a position of a parking lot specified by the information center.

To prevent this phenomenon, a method has been considered for specifying a point with respect to a map by a relative positional relationship with respect to roads (links). For example, this method (tentatively referred to as a relative positioning method) specifies a link by a link number, specifies the distance on the link from the starting point, and further specifies the direction and distance from the starting point. In this manner, by specifying the point as a relative positional relationship, breakdowns in the positional relationship of the road and the point to be specified can be prevented. Note that the links are organized in units of roads separated by intersections, and the road network is expressed as connections of these links in the map database.

The relative positioning method herein assumes that the link numbers at the vehicle and at the information center have identical definitions. However, due to differences in source materials and update times, there are instances where a link specified at the side executing a command does not exist. Furthermore, when there are differences in map precision, a link specified at the information center may not exist at the vehicle. In this instance, a problem is that it might not be possible to specify a point at the receiving side.

DISCLOSURE OF INVENTION

It is an object of the present invention to provide a position information provider system capable of displaying the position (specific position), such as of a facility for which information was requested, at an appropriate position on a map.

The present invention uses landmarks, such as of road networks, on map displays that are common to the map database of the information center and to the map database of the terminal so as to correct displacements between the two map databases. The specific position (facility position) to be the information provided is set as a relative position with a landmark on the above-mentioned map in the map database of the information center, and correcting the displacement as described above enables the above-mentioned specific position to be displayed on the map at the terminal with the same positional relationship as on the map at the information center.

Therefore, when the relative position of the above-mentioned landmark and the above-mentioned specific position is displayed on the map at the terminal, an improper display can be prevented.

For example, if the above-mentioned landmark is a road and the above-mentioned specific position (facility) is on the right side of the road according to the map at the information center, the display of the facility on the map at the terminal on the opposite side, or on the left side of the road, can be prevented. Therefore, a problem can be prevented in which a facility, thought by the driver to be on the left side of the road on the map, appears on the right side. In the relative position with the above-mentioned landmark, problems arise, such as the above-mentioned facility being incorrectly displayed on the opposite side of the road, and besides the above-mentioned road, a railroad track, a river, a coastline, and so forth are landmarks. In the case of a river, which can be crossed only at a bridge, if a facility is displayed on the opposite side of its actual position and the destination is incorrect, the bridge must be crossed in order to return to the correct position and much time will be wasted. A similar situation occurs for a railroad track. In the case of a coastline, there is the possibility of having an unnatural display in which the facility to be the destination is shown in the middle of the ocean. Extracting from the landmarks on the map display can prevent such improper displays described above.

Furthermore, the information regarding the above-mentioned landmark can be made to include the shape and type of the relevant landmark. An example of landmark type for roads is the route number or name to specify a road, such as national route 1 or Keihin route 3. On the basis of information on type, the number of landmarks to be searched by shape can be reduced and processing in a short time becomes possible.

Furthermore, the above-mentioned terminal transmits the type of map database held in the relevant terminal, and the above-mentioned position information generating means extracts the above-mentioned landmark in accordance with the received type of map database and generates position information.

According to this configuration, from the information stored in the map database held in the terminal, such as that indicating the degree of detail of the map, the information center can provide information regarding the facility on the basis of map information according to the degree of detail of this map. For example, if the roads stored in the map database of the terminal are only highways, the information center extracts from the map database the highway found in the periphery of the facility as the peripheral landmark, and if local roads, such as municipal roads, are also stored in the terminal, the information center extracts from these roads the roads in the periphery of the facility and sends them to the terminal. Therefore, the information that can be effectively used at the terminal can be transmitted from the information center.

Furthermore, in the above-mentioned information provider system, which transmits the type of map database held in the terminal to the information center, the peripheral landmarks that the above-mentioned position information generating means extracts include roads according to the above-mentioned received type of map database held in the terminal, and the information regarding a specific position can be made to include a reference point, which has been set in advance on the above-mentioned extracted road, and detailed route information up to the specific position to be provided.

According to this configuration, sending route information from the above-mentioned reference point to the above-mentioned specific position (facility) enables a map to be sent with more detail than the map database held in the terminal, thus allowing the facility position to be displayed in more detail.

Furthermore, in the various above-mentioned information provider systems, the peripheral landmarks that the above-mentioned position information generating means extracts can be two mutually connected roads positioned to sandwich the specific position (facility) of the information to be provided. According to this configuration, the display accuracy of the facility of the information to be provided can be improved.

It is preferable for the information center to generate relative position data using links, which are units forming the roads. The terminal requests a retransmission when the link that is used in the received relative position data does not exist in the terminal map database, and the information center, upon receiving the retransmission request, transforms the absolute position data into relative position data with another close link and retransmits it.

Therefore, when the link used in the relative position data in the information center does not exist in the map database at the terminal, the information center retransmits the relative position data using another link so that the position can be specified in the terminal using another link.

Transforming the absolute position data, such as of a facility, into relative position data enables the regular map database in which the absolute positions and coordinate positions are associated to be used.

The above-mentioned center map database stores a rank for each link, and it is preferable for the information center to transmit relative position data using a link having a rank higher than that of the link previously transmitted during retransmission.

The map database at the terminal often has a low accuracy, and the data regarding roads having high ranks is often common to the map databases. Using the link having a high rank during retransmission can raise the probability that the relative position data can be recognized at the terminal.

It is preferable for the above-mentioned information center to also transmit the absolute position data during transmission of the relative position data, the above-mentioned terminal to specify the link close to the absolute position data existing in the terminal map database during a retransmission request, and the above-mentioned information center to transmit the relative position data using the specified link in the retransmission request. In order for the terminal side to specify a link to be used by the relative position data, the relative position data that used the link must exist in the map database at the terminal. Therefore, the transmission of reliable position information can be achieved from retransmission.

It is preferable for the information center to transmit data regarding the shape of the link that did not exist in the terminal map database to the terminal, and for the terminal to update the terminal map database from the received data regarding the shape of the link. Data regarding a new link is added to the terminal map database in this manner. This new link is useful in specifying the provided position, and it is preferably used until the position is reached. This update realizes a more preferable route guidance for the next driving trip.

It is preferable for the information center to use data on the shape of the link to be transmitted as relative data using the link which exists in the terminal map database. With the relative data using the link which exists in the terminal map database in this manner, correct relative position relationships of new links and already existing links can be maintained.

Furthermore, it is preferable to include a map database for storing the road network as coordinate values on the map associated with absolute positions, and transforming means for transforming an arbitrary absolute position into a relative position with the road network, and to provide the absolute position data after conversion into relative position data. As a result, transactions of position information from relative position data are performed using the regular map database.

MODE(S) FOR CARRYING OUT THE INVENTION

Embodiments of the position information provider system to which the present invention concerns are described with reference to the attached drawings.

First Embodiment

Figure 1:
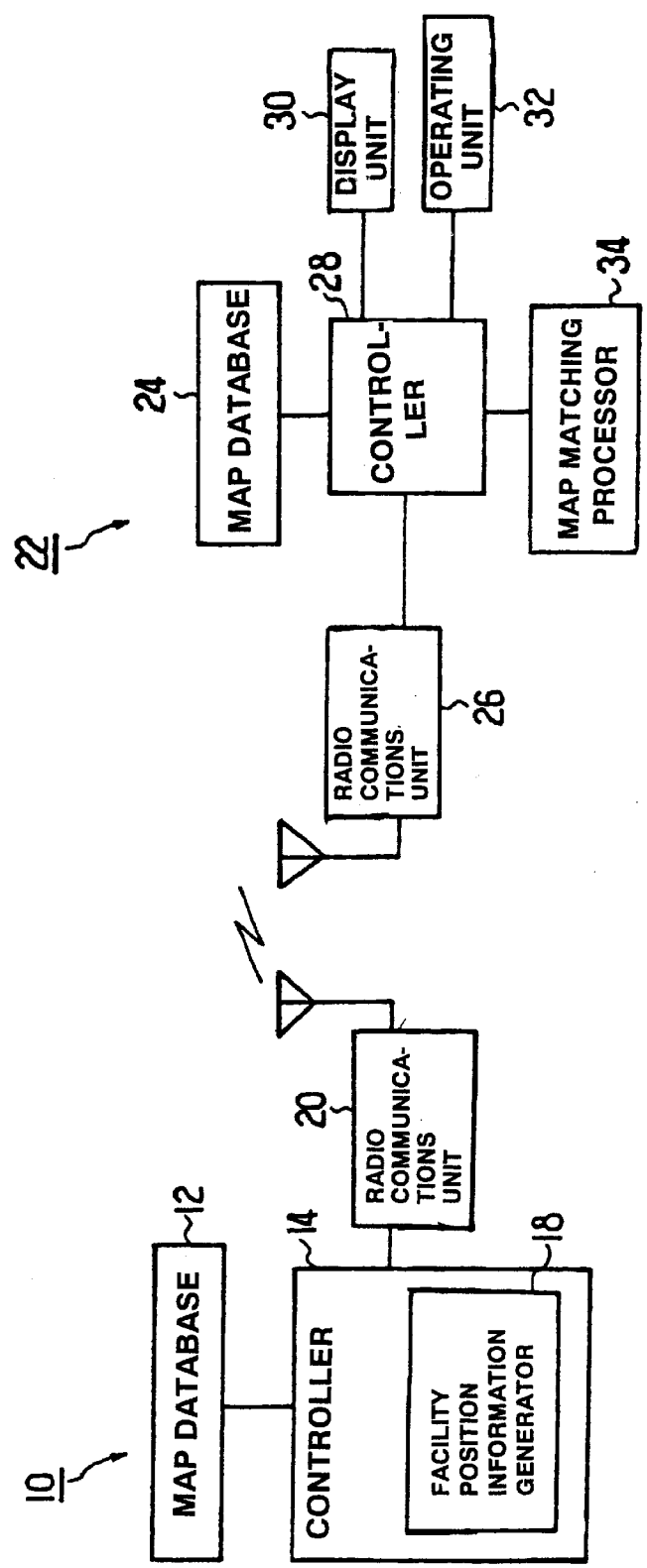
FIG. 1 is a block diagram of a first embodiment of a position information provider system concerned with in the present invention.

FIG. 1 shows a simplified configuration of the first embodiment. An information center 10 has a map database 12 for storing information necessary to display a map, such as the information on topography of rivers and coastlines and on structures of roads, bridges, and buildings. This map database 12 can also store information regarding the above-mentioned structures, and if the structure is a parking lot, for example, information on the parking lot's capacity as well as the present number of parked cars. The information center 10 has a controller 14 for reading out information from the map database 12 in accordance with an information request of a terminal to be described later. When there is a request for information regarding a certain facility from the terminal, the controller 14 has a facility position information generator 18 which extracts from the map database 12 a predetermined number of information items regarding landmarks in linear form on the map notation, such as rivers, railways, and roads in the periphery of the relevant facility, and furthermore reads out information regarding the relative position of the above-mentioned facility with the peripheral landmarks from the map database 12. The information center 10 has a radio communications unit 20, which transmits information regarding the positions of peripheral landmarks and information regarding the positions of facilities and receives information transmission requests from a terminal 22.

Meanwhile, the terminal 22 is disposed in a moving object, such as an automobile. The terminal 22 also has a map database 24, which need not be identical to the map database 12 of the information center 10. Map databases have varying degrees of accuracy depending on the manufacturer or depending on the specifications even from the same manufacturer, and the degree of map detail, such as the narrowness of the roads stored, may differ with every database. The terminal 22 further has a radio communications unit 26, which requests information on a desired facility from the information center 10 and receives information transmitted from the information center 10 according to the request. A controller 28 is provided for checking the data of the map database 24 held in the terminal with the information regarding a facility received by the radio communications unit 26. A display unit 30, such as for displaying maps according to commands from the controller 28, and an operating unit 32, such as for use by a driver in selecting desired information on a facility, are provided. Furthermore, a map matching processor 34 is provided for calculating the amount of shift between the map databases of the information center and the terminal by comparing characteristically shaped objects on the map display from information sent from the information center 10 with corresponding landmark shapes in the map database 24 of the terminal.

As mentioned above, map databases have varying degrees of accuracy depending on their type. This is due to the reasons given hereinafter.

One is that maps are planar representations of topography originally shaped on a sphere so that error is introduced during this transformation. In maps of a scale used in vehicle route guidance apparatuses, the transformation from spherical to planar is performed for every predetermined section, resulting in an increase in error during transformations at the periphery of each section. If the processing of this error differs with every map database, points with the same latitude and longitude may be represented differently. Furthermore, if the sections are assigned differently with every map database, a point near the center of a section in one map database and having only a slight error from transformation may be in the periphery of a section in another map database and have a considerable error from transformation. Thus, in this case, the same point is represented as different positions in these two databases.

Next, since the map databases used in automobile route guidance apparatuses assume that the route guidance is to be performed with certainty, the positions of roads may be displayed at positions different from actuality. For example, there are instances where a gently curved road actually having a large radius is displayed as a straight road. Also, if an ordinary road runs below and a turnpike runs above so that the two roads match perfectly and are indistinguishable when shown on a map, there are instances where one of the roads is purposely displayed in a position that is different from actuality. If there is a difference in map notation between map databases, discrepancies in indicated positions may result where a facility shown on the right side of a road in one database is shown on the left side of the road in another database.

This embodiment intends to match the information between different map databases in accordance with the method to be described hereinafter.

Figure 2:
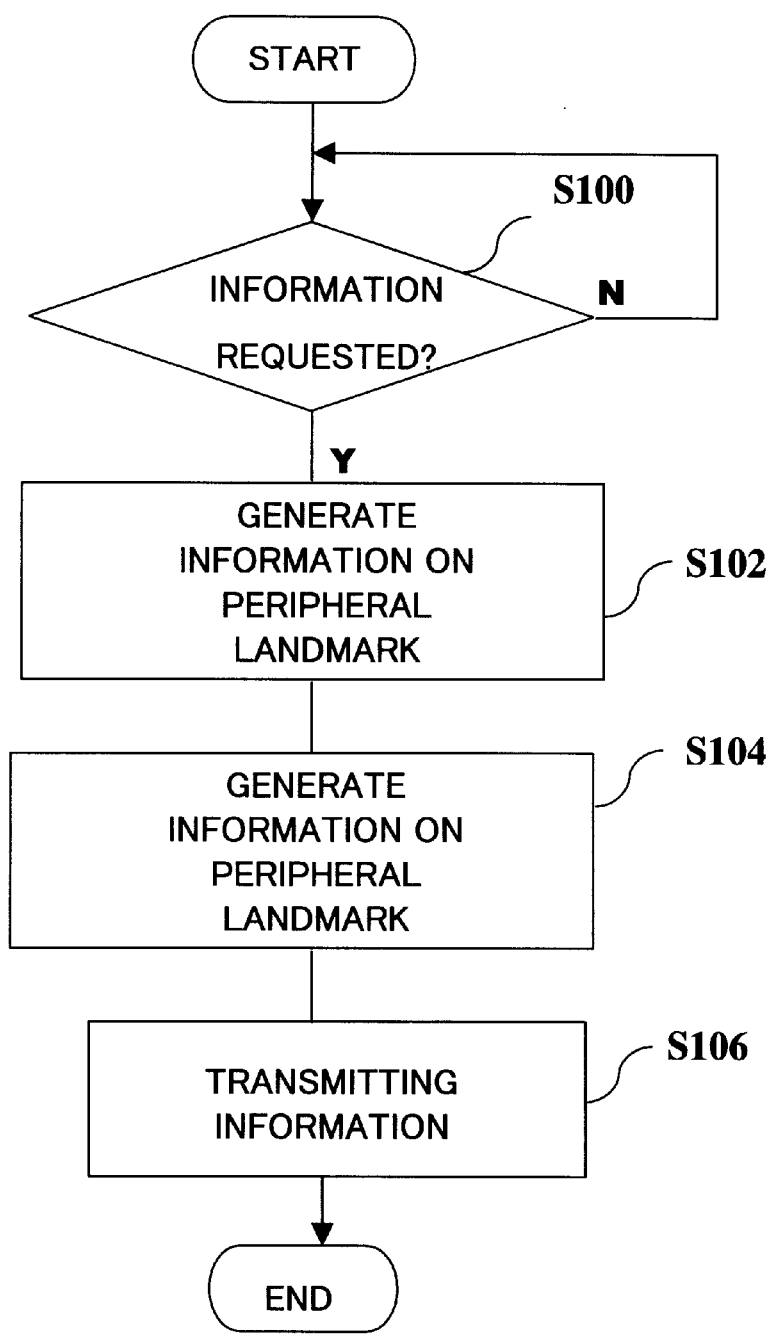
FIG. 2 is a control flowchart at an information center of the first embodiment.
Figure 3:
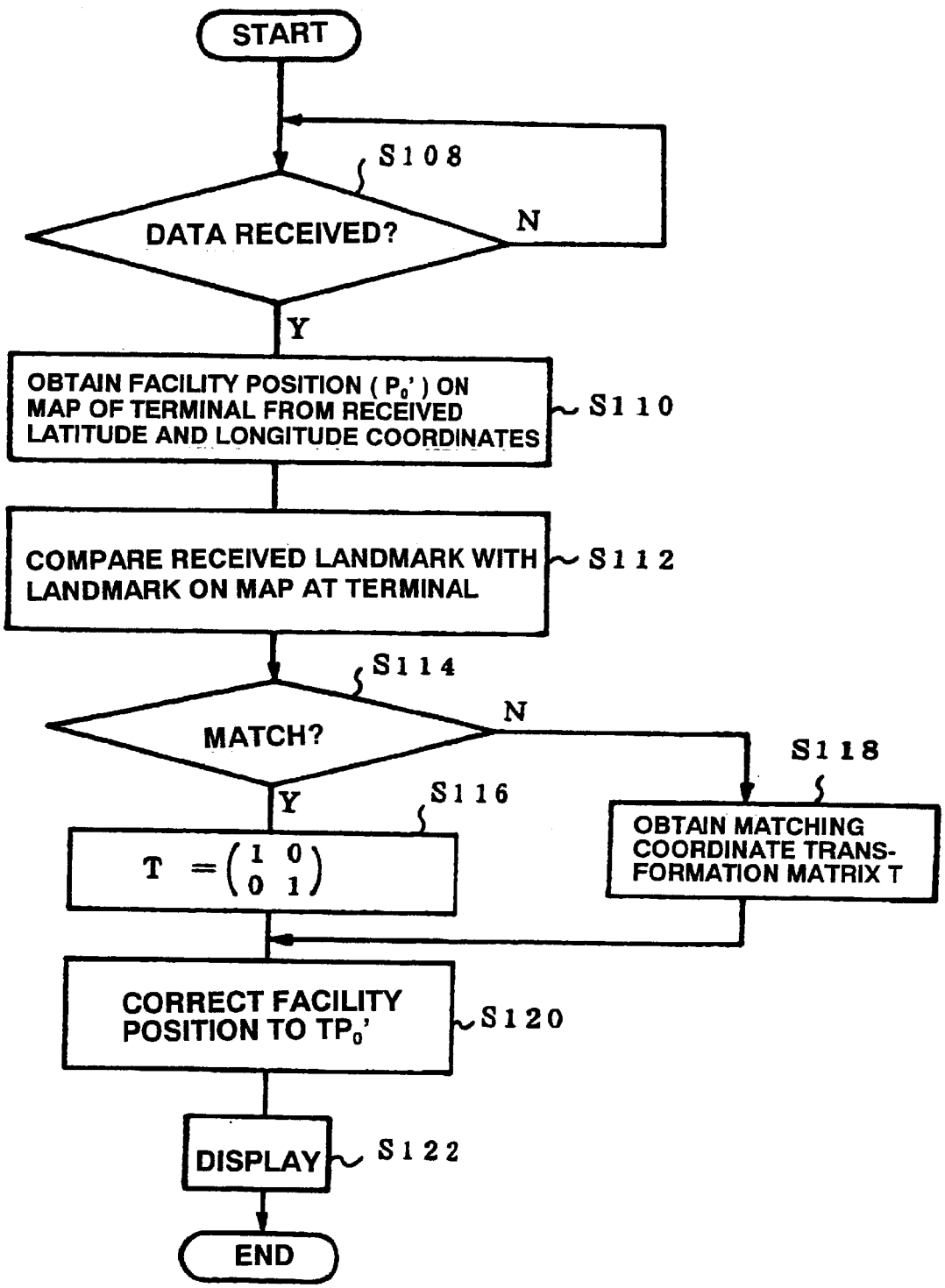
FIG. 3 is a control flowchart at a terminal of the first embodiment.

FIGS. 2 and 3 are flowcharts regarding basic control operations of the apparatus of the present embodiment. In particular, FIG. 2 is a flowchart of processing at the information center and FIG. 3 is a flowchart of processing at the terminal. Furthermore, FIGS. 4(a)–4(d) illustrate the information processing of the apparatus of the present embodiment.

First, a request for information regarding a certain facility is sent from the terminal 22. This control operation is not shown in particular in the flowchart of FIG. 3. A passenger of a moving object operates the operating unit 32 to select a desired facility so that a request for information regarding this facility can be made. The facility may be, for example, a parking lot or a restaurant, and the contents of the information regarding the parking lot may include the position, parking lot capacity, and present vacancy status, and regarding the restaurant may include the position, availability of parking, and type of cuisine.

As shown in FIG. 2, the information center 10 monitors whether or not a request for information regarding a certain facility was made from the terminal 22 (S100). If there was an information request, a landmark on a map display in the periphery of the relevant facility is extracted from the map database 12 by the facility position information generator 18 (S102). If the landmark on the map display has a linear form, such as a road, railroad track, river, or coastline, and the facility located on one side of the linear landmark is displayed as being on the other side, the person receiving the information will misunderstand or become confused. For example, if the landmark is a road and the facility located on the right side of the road with respect to the direction of travel is displayed as being on the left side, the person receiving the information will misunderstand the position of the relevant facility and may not even be able to reach the facility.

The extraction of the peripheral landmark is described in FIG. 4. which shows a peripheral map of a facility 50, for which there was an information request, on the map database 12 of the information center. In the periphery of the facility 50 positioned at point $P_0$ of longitude $X_0$, latitude $Y_0$ are located two roads 54, 56 crossing at an intersection 52. In the map database, the roads 54, 56 are each partitioned from the intersection 52 into two road links 54a, 54b and 56a, 56b. Extracted are two landmarks in the periphery of the facility 50 that connect to each other, are positioned so as to sandwich the facility 50, and are positioned the closest and the next closest to the facility 50. In the example of FIG. 4, road links 54b, 56b connected at the intersection 52 and positioned so as to sandwich the facility 50 from the top and bottom are extracted.

Furthermore, information regarding the facility position is generated (S104) at the facility position information generator 18. This information includes information indicating the relative positional relationship of the facility 50 with respect to the landmarks extracted in step S102, and more specifically, the position of point $P_0$ with respect to points A and B, which are closest to point $P_0$ on the above-mentioned landmarks 54b, 56b. Furthermore, the information regarding the facility position includes the latitude and longitude of point $P_0$.

Figure 4A:
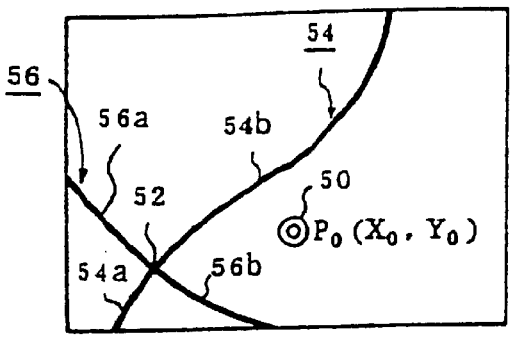
FIGS. 4(a), 4(b), 4(c) and 4(d) illustrate the matching of information from the information center with information of map database of the terminal of the first embodiment.
Figure 4B:
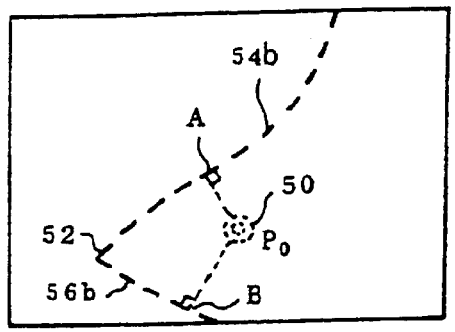

As shown in FIG. 4(b), the information regarding the positions of the peripheral landmarks and the facility generated in step S102 and step S104 is graphic information representing the shape of road links 54b, 56b and the relative positional relationship of the facility with the relevant road links 54b, 56b. This information is then transmitted from the information center (S106).

Figure 4C:
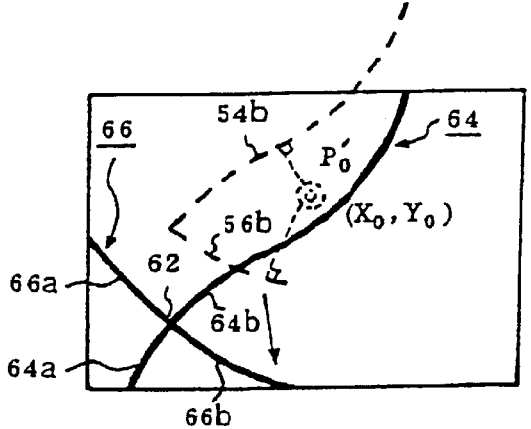

The terminal 22 waits for and receives (S108) information regarding the requested facility, namely, information regarding the above-mentioned peripheral landmarks and facility position, transmitted from the information center 10. Then, based on the received latitude and longitude information on the facility, facility position $P_0'$ ($X_0$, $Y_0$) on the map database 24 of the terminal is determined (S110). This position may be a position differing from that in the map database 12 of the information center as shown in FIG. 4(c). Describing FIG. 4(c) in detail, roads 64, 66 correspond to the roads 54, 56 in the map database 12 of the information center and intersect at an intersection 62. The roads 64, 66 are further partitioned at the intersection 62 into road links 64a, 64b and 66a, 66b. Longitude $X_0$ and latitude $Y_0$ representing the position of the facility are directly shown on the map database of the terminal as position $P_0'$ With this facility position $P_0'$ as a reference, the road links 54b, 56b extracted at the information center exist at the positions shown as broken lines in FIG. 4(c).

The positions of the received landmarks and the landmarks in the map database in the terminal are then compared (S112). If they match (S114), a transformation matrix T is defined (S116) according to the following formula.

$$T = \begin{bmatrix} 1 & 0 \\ 0 & 1 \end{bmatrix}$$

Figure 4D:
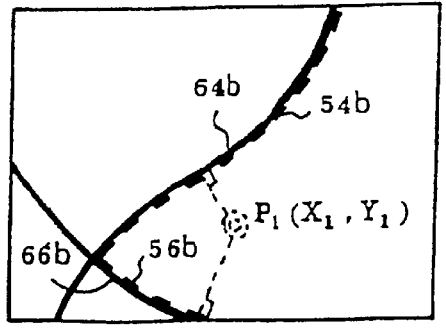

In this transformation matrix T, a coordinate transformation is actually not performed. On the other hand, as shown in FIG. 4(c), if the positions of the received landmarks and the corresponding landmarks in the map database of the terminal do not match and are shifted, a transformation matrix T for eliminating this shift is calculated (S118). Namely, as shown in FIG. 4(d), the transformation matrix T is determined so that the received road links 54b, 56b match with the road links 64b, 66b on the map of the terminal. This is achieved through known map matching methods and this operation is performed at the map matching processor 34. The transformation matrix T is defined according to the following formula.

$$T = T_P T_R$$

where $$T_P = \begin{bmatrix} a & 0 \\ 0 & b \end{bmatrix}$$

$$T_R = \begin{bmatrix} \cos\theta & -\sin\theta \\ \sin\theta & \cos\theta \end{bmatrix}$$

Namely, the transformation matrix T is defined by parallel movements ($T_P$) for movements in the latitudinal and longitudinal directions (a, b) and a rotational movement ($T_R$) for movement through an angle θ.

This transformation matrix T enables facility position $P_1$ ($X_1$, $Y_1$) on the map to be calculated (S120) in accordance with the following formula by transforming facility position $P_0'$ ($X_0$, $Y_0$) in accordance with the received data.

$$P_1 = TP_0'$$

The facility position $P_1$ on the map held in the terminal is then displayed on the display unit 30 (S122).

Thus, the present embodiment can prevent an improper display, such as the display of the facility for which information was requested on the side opposite of its actual position with respect to a road or river.

In the present embodiment, the information regarding the peripheral landmarks to be transmitted from the information center 10 can include such information as route numbers of roads (for example national route 1), width of roads, river names, and so forth. Thus, this map matching operation can be performed in a shorter time than when compared to the operation for specifying by shape alone.

Furthermore, the information regarding the facility position to be transmitted from the information center 10 can be made to include only the relative position information with the peripheral landmarks without the latitude and longitude information on the facility position. If the route number or the like is specified as described above, landmarks for the map matching can be narrowed down so that the operation need not require a considerable amount of time even though the latitude and longitude are not specified.

The information regarding the facility position can also be made to include relative position information with the peripheral landmarks and the address of the facility. A general position of the facility can be determined from the address of the facility, and a search can be made of landmarks in its periphery having shapes matching the peripheral landmarks of the received information so as to also enable the facility position to be calculated.

Figure 5:
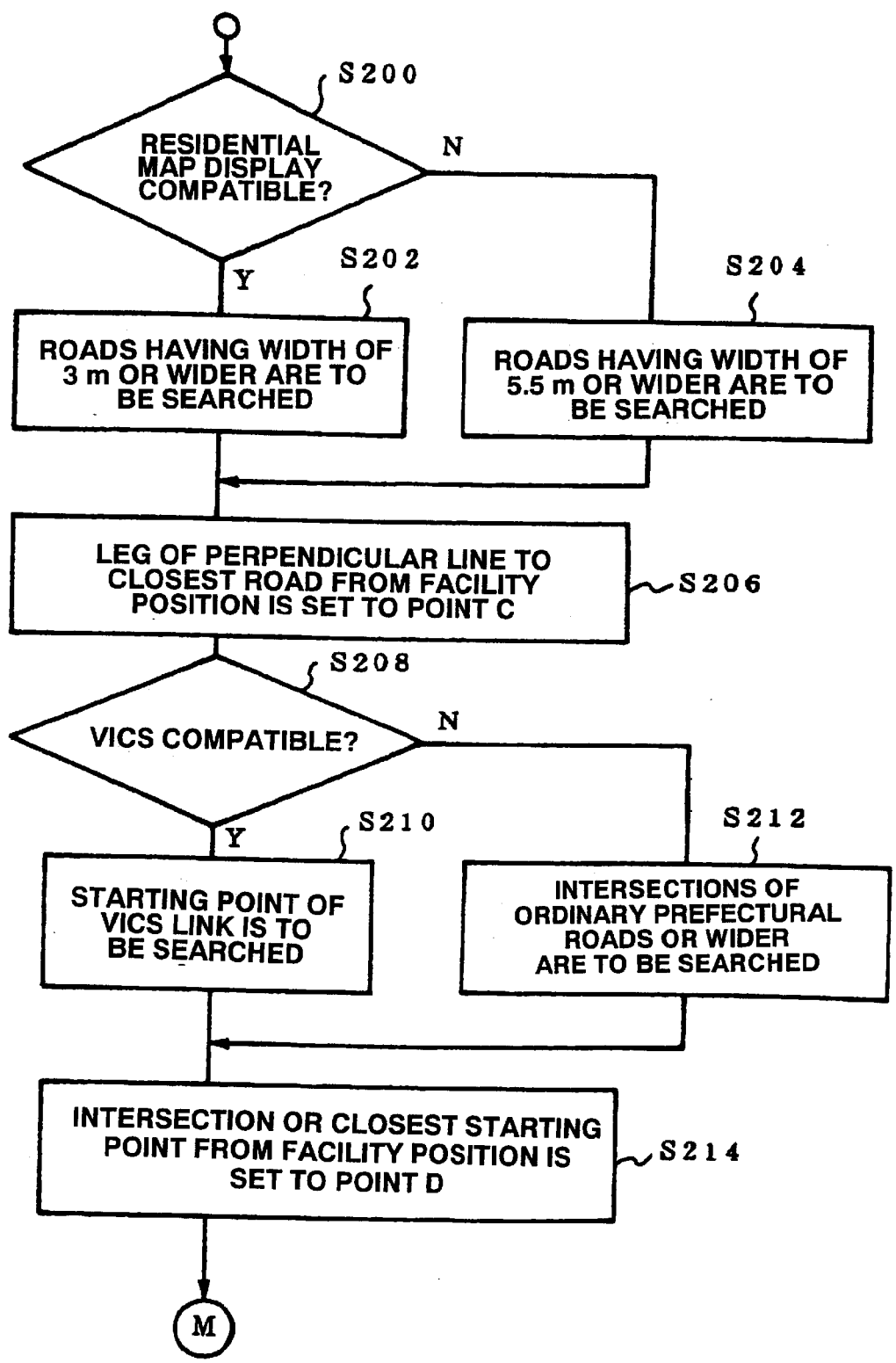
FIG. 5 is a control flowchart showing an example of a creation method of peripheral landmark information of the first embodiment.
Figure 6:
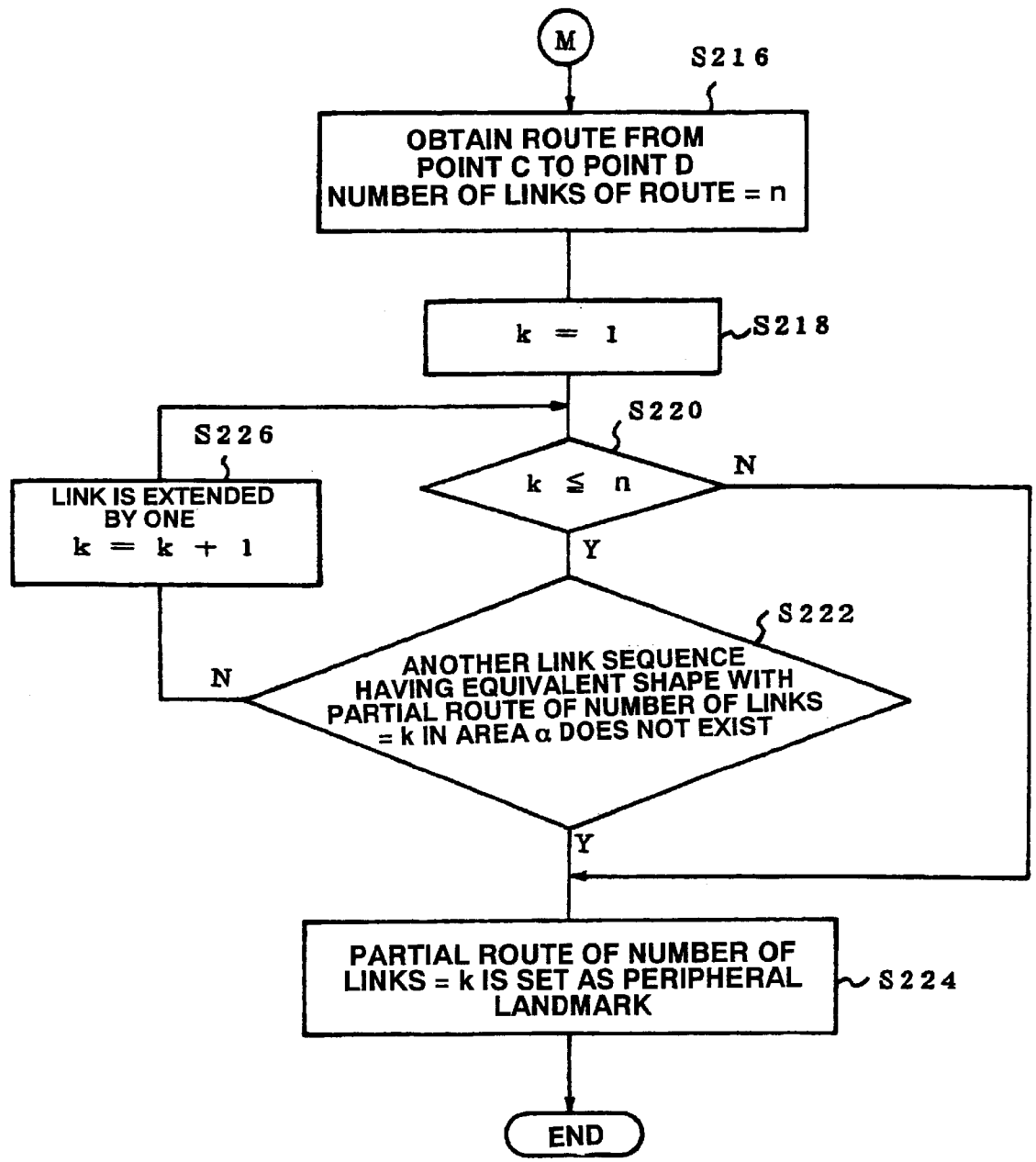
FIG. 6 is a control flowchart showing an example of a creation method of peripheral landmark information of the first embodiment.

FIGS. 5 and 6 are flowcharts showing one example of a method for the extraction of peripheral landmarks at the information center. Namely, one example of step S102 in the flowchart shown in FIG. 2 is shown in detail. Furthermore, in this method, at the information request from the terminal 22, information indicating the type of map database 24 held in the relevant terminal is sent to the information center 10.

First, it is judged whether or not the terminal 22 is compatible with the display of maps (residential maps) having sufficient detail to permit the position of an individual residence to be found (S200). If the display is compatible with the residential map display, a search is set for roads having a width of 3 meters or more (S202), and if the display is not compatible, the search is set for roads having a width of 5 meters or more (S204). Among the roads to be searched, a terminal of the perpendicular line to the road link closest from the facility position is designated as point C (S206).

Next, it is judged whether or not the terminal 22 is compatible with maps (VICS maps) specified by the VICS (Vehicle Information and Communication System) Promotion Committee (S208). If compatible, the starting point of the road link specified in the VICS map is set for the search (S210), and if not compatible, intersections of ordinary prefectural roads or wider (roads classified to a certain level on upper levels) are set for the search (S212). Among the starting points or intersections of road links for the search, the closest starting point or intersection from the facility position is designated as point D (S214).

A route from point C to point D is then determined, and a sequence of links making up this route is designated from the link closest to point C as link 1, link 2, . . . , link n (S216).

Since point D (endpoint of link n) is a point uniquely set regardless of the type of map database, the position of point C can be uniquely set from the route from point C to point D (link 1 to link n).

However, if all links (n links) making up this route are transmitted, the amount of transmission data may become large. The procedure given hereinafter performs a reduction in the number of transmitted links.

Namely, a partial route comprising k items from link 1 (closest link to point C) to link k ($1 \leq k \leq n$) is transmitted to the terminal 22. This link sequence is connected in a unique manner and has a minimum number of links.

First, k=1, namely, the partial route comprising the closest link to the facility position for which information is to be provided is selected (S218). Then, it is judged whether or not the number of links k of the partial route has reached the number of links n of the entire route, namely, whether or not a partial route longer than the route from point C to point D has been selected (S220). Then, it is judged whether or not there is another link sequence equivalent in shape to the partial route having k number of links within a predetermined area (S222).

Figure 7:
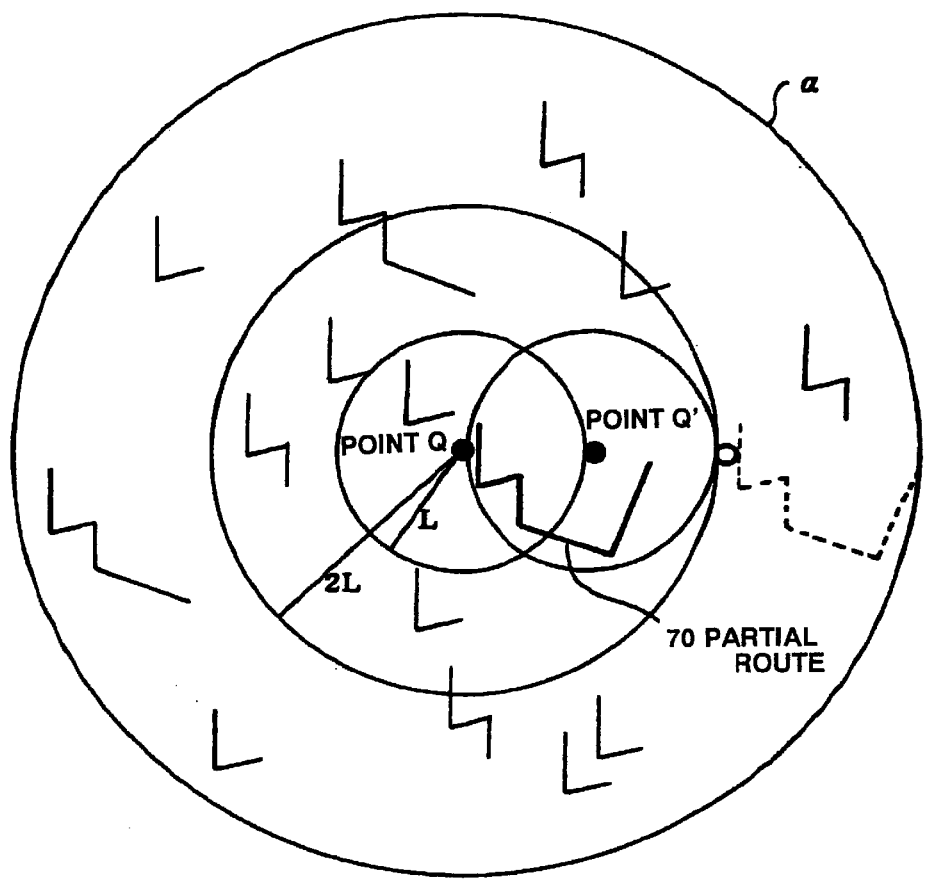
FIG. 7 illustrates a search range for peripheral landmarks.

The area for which searching of the link sequence is performed can be set in the following manner. If the maximum value of error between map databases is L, it is possible for point Q', which is separated from the facility position P by distance L as shown in FIG. 7, to be mistaken for the point transmitted from the information center. From the viewpoint of the terminal, the actual facility position is within a circle centering on point Q' having a radius of L so that it is sufficient for the terminal to perform position correction within this range. From the viewpoint of the information center, the terminal searches for the actual position within a circle centering on point Q having a radius of 2L. Thus, for a peripheral landmark to be extracted, namely, a partial route 70, an area in which the circle having a radius of 2L is enlarged by a size of the partial route must not have a link sequence having the same shape as the partial route 70. This area is denoted hereinafter as area α.

Within this area α, if there is no other link sequence having an equivalent shape to the partial route of k number of links (S222), this partial route is set as the peripheral landmark (S224). Otherwise, if there is a link sequence having the same shape as the partial route within area α, the link is extended by one toward point D in the route from point C to point D (S226). Therefore, the number of links k is updated by the addition of 1 to the previous number of links. This is then repeated until k reaches n (S220), and the partial route is extracted as the peripheral landmark when there are no more link sequences having the same shape.

Judging the type of links making up the partial route, such as the route number or name of the roads, and further the width of the roads, and not only the shape of the link sequence making up the partial route, enables the peripheral landmark to be formed from a small number of links.

When searching the route from point C to point D, the peripheral landmark can be formed from a small number of links by increasing the number of left and right turns so that the changes in the shape and type increase.

Figure 8:
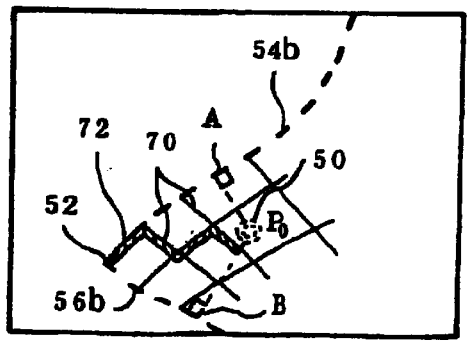
FIG. 8 illustrates an example where a detailed map of a facility periphery is included in facility position information.

Furthermore, in the above-mentioned embodiment, the facility position information can be made to contain a map of the partial route 70, as shown in FIG. 8, from a predetermined reference point to the facility 50 on which information is to be provided. The reference point can be set to the starting point of the VICS link or the intersection 52 of ordinary prefectural roads or wider as described above. A route 72 from the intersection 52 to the facility 50 can also be included in the facility position information.

In the above-mentioned embodiment, the sending and receiving of information between one terminal and the information center was described. A system need not be limited to this, and information may be transmitted unilaterally from the information center regardless of a request from the terminal. Furthermore, in accordance with a request from a terminal in a system, information may also be transmitted from the information center to another terminal.

Second Embodiment

General Configuration

Figure 9:
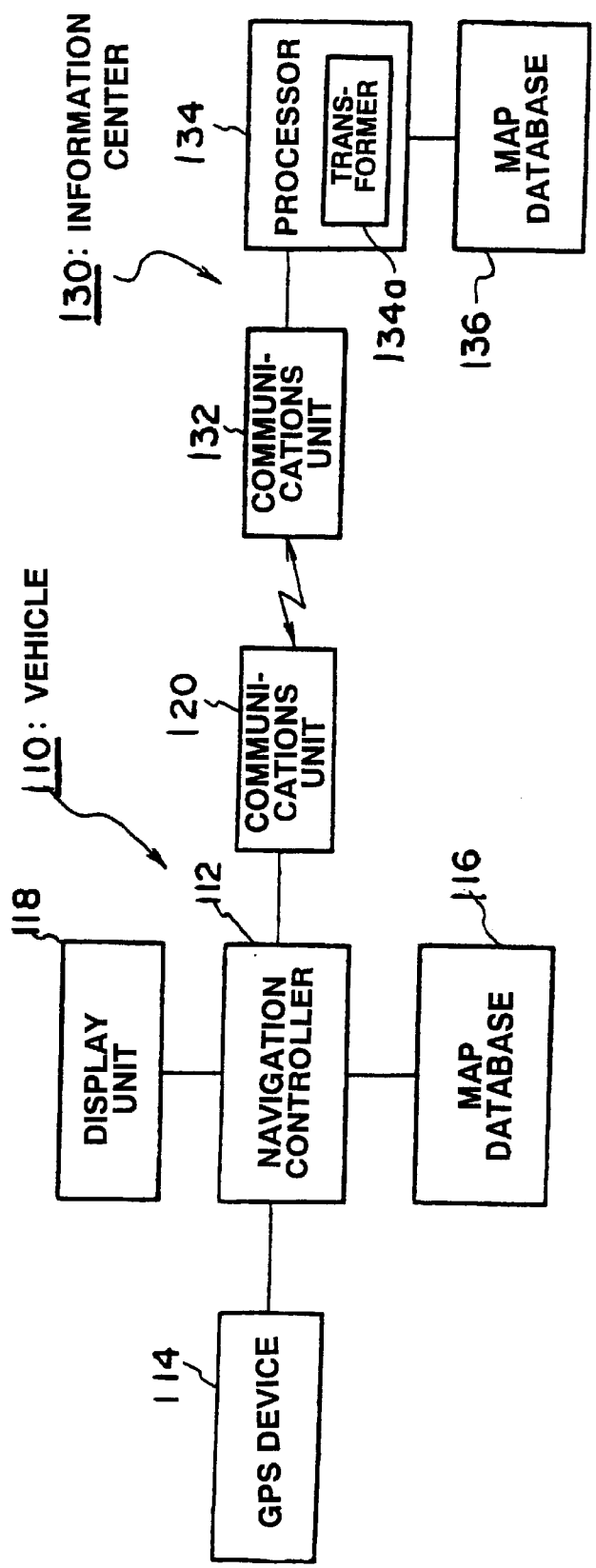
FIG. 9 is a block diagram showing a general configuration of a second embodiment.

FIG. 9 is a block diagram showing a configuration of the position information provider system to which the second embodiment concerns. A vehicle 110 is provided with a navigation controller 112 for performing various types of data processing. To the navigation controller 112 is connected a GPS device 114. The GPS device 114 detects the present position of the vehicle 110 by receiving radio waves from artificial satellites. It is also preferable to use a DGPS (differential GPS) device for detecting the present position with greater accuracy by obtaining error information, such as from FM multiplexed broadcasts.

To the navigation controller 112 is connected a map database 116. The map database 116, which may be based on CD-ROM, stores map information of the entire country of Japan. In the present embodiment, the map database 116 stores relatively simple map information since information is obtained from an external information center 130. To the navigation controller 112 is connected a display unit 118, which performs the display of various types of information. To the display unit 118 is provided a touch panel so as to allow various types of data inputs by touching of the screen.

Furthermore, to the navigation controller 112 is connected a communications unit 120. This communications unit 120 performs data transmission and reception based on mobile communications, particularly with the external information center 130.

The information center 130 includes a communications unit 132, which performs data transmission and reception based on mobile communications with the vehicle 110. The information center 130 further includes a processor 134 and a map database 136 to perform various types of information provider services and the processing for these services. In particular, the map database 136 stores map data associated with corresponding latitude and longitude based absolute position data. In the processor 134 is a transformer 134a to serve as relative position relationship specifying means. The transformer 134a transforms the absolute value data that was read out from the map database 136 into relative position data, which is a relative expression using close links. Therefore, the information center 130 can provide map data, expressed as both absolute position data and relative position data, to the vehicle 110. Furthermore, the information center 130 is connected to other types of information centers by radio or wire so that traffic jam information, event information, and other information can be obtained. The map database 136 has extremely detailed data which is always kept up to date.

General Operation

It is assumed that a driver of the vehicle 110 in this sort of system desires to travel to a parking lot near a certain station. In this case, the relevant input is performed by an operation of the driver. From the transmission command, the navigation controller 112 sends this request via the communications unit 120 to the information center 130. The information center 130 selects an optimum parking lot by taking into consideration the local map database 136, the state of congestion of the parking lots, and so forth, and provides the position of the parking lot to the vehicle 110.

Figures 10, 11:
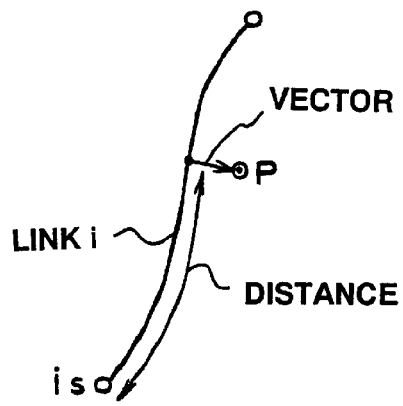
FIG. 10 illustrates contents of relative position data of the second embodiment.
FIG. 11 shows the organization of relative position data of the second embodiment.

At this time, the processor 134 of the information center 130 transforms the absolute position data of the parking lot obtained from the map database 136 into relative position data at the transformer 134a. For example, if the position of the parking lot (point P) is near link i as shown in FIG. 10, point P is expressed from a relative position with link i. Namely, as shown in FIG. 11, the link number of the close link, the distance from the starting point node of the link (terminal of the link) to the closest point, and a vector (direction, distance) from the point are sent to the vehicle. A secondary mesh number indicates which map data, and the map data of the entire country, after being roughly partitioned into a primary mesh, is partitioned into a secondary mesh. An ordinary map display is then performed using the map data in secondary mesh units. Specifying a mesh and then a link number enables a part of a road to be specified.

The navigation controller 112 of the vehicle 110 that received this sort of data reads out the corresponding map data from the local map database 116 and displays it on the display unit 118, and based on the received data, specifies the point P according to link i and displays it on the map. In this manner, since the point P is specified as a relationship with the link, the position of the point P will not end up on the opposite side of the road.

The map databases 116, 136 normally need only store absolute positions as associated with coordinate positions on the map so that conventional maps can be utilized without change.

Processing for When a Link Cannot be Specified

Link i that was used in the data for point P sent from the information center 130 may not exist in the vehicle 110. In this case, the vehicle 110 notifies the information center 130 accordingly. This notice of nonexistence becomes a retransmission request. The information center 130 changes the rank of the link to be used and performs retransmission.

Figures 12, 13:
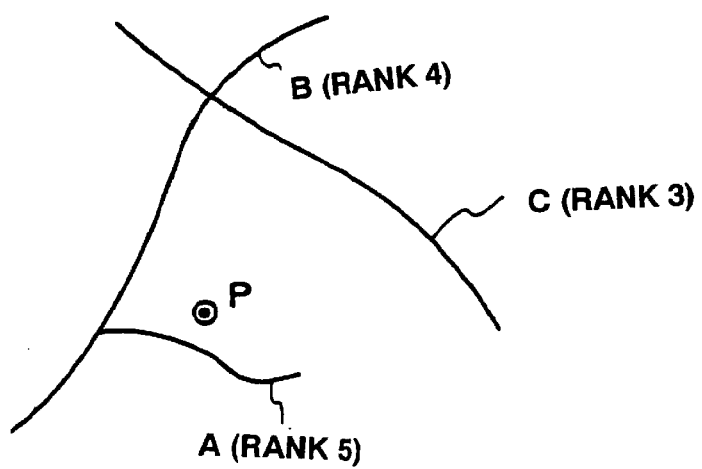
FIG. 12 shows ranks of roads.
FIG. 13 shows an example of a point and ranks of links adjacent thereto.

One example of the ranks of links is shown in FIG. 12. In this manner, each link is assigned a rank according to the type of road, such as rank 1 for expressways, rank 2 for national highways, rank 3 for prefectural roads or ordinary roads of width 13 m or wider, rank 4 for ordinary roads of width 5.5 to 13 m, and rank 5 for ordinary roads of width 3 to 5.5 m, and this is stored in the map database 136.

For example, the point P to be specified is at a position shown in FIG. 13 with link A of rank 5 the closest, link B of rank 4 the next closest, and link C of rank 3 the next closest after link B. In this case, the information center 130 uses link A of rank 5 to specify point P and notify the vehicle 110 of the position of point P. When a retransmission request arrives, the rank is changed in sequence to a higher one in order to use bigger links.

Figure 14:
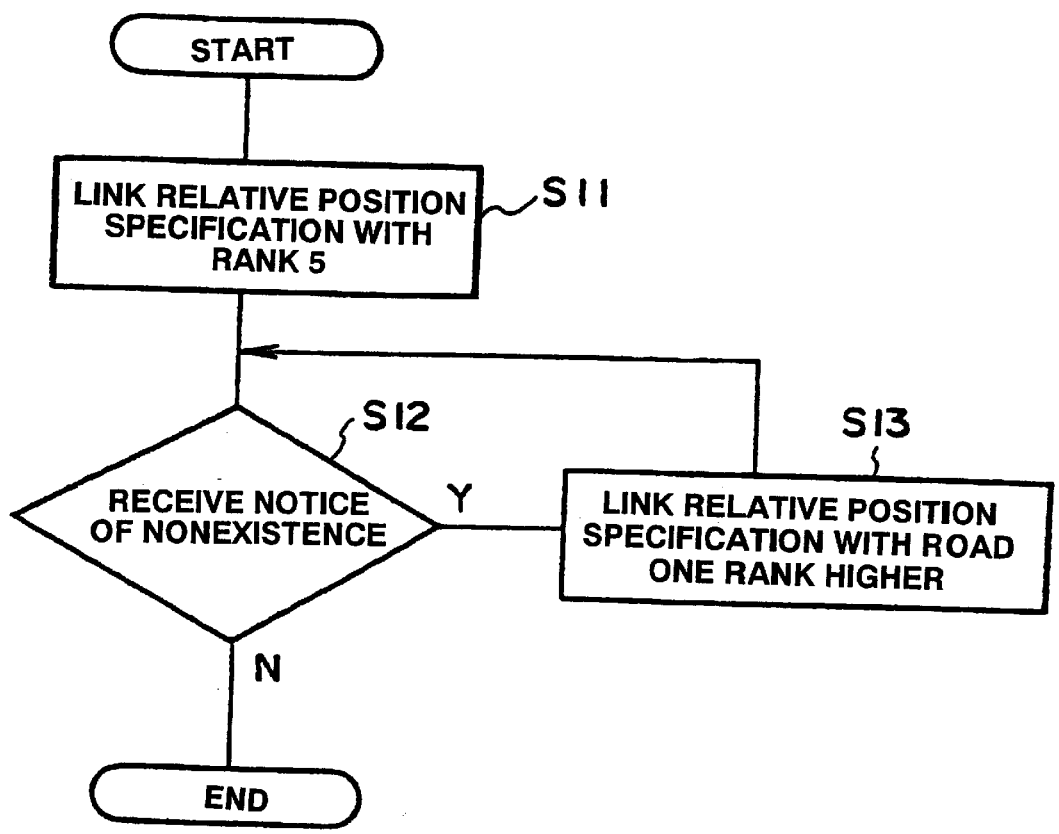
FIG. 14 is a flowchart showing an example of a retransmission procedure for the second embodiment.

Namely, as shown in FIG. 14, the information center 130 first relatively specifies the position of point P from link A of rank 5 and transmits it to the vehicle 110 (S11). Then, for a predetermined time, a check is made for a response to the effect that the link A does not exist (S12). In S12, if a notice of nonexistence is received, the relative position of point P is specified with a road one rank higher (link B of rank 4 in this case) and transmitted (S13). If the result of S12 is YES, the rank is further raised and the relative position is transmitted.

In this manner, the notice of nonexistence is interpreted as a retransmission request, and retransmission is performed. During this retransmission, a link having a high rank is used to specify the relative position. In the map database 116 of the vehicle 110, there is a high probability that the only data available concerns roads having high ranks, and that roads having high ranks are assigned the same link number even in the map data of different sources. Raising the rank in this manner raises the probability that a position will be specified by a relative position.

Furthermore, it is preferable to impose a fixed limitation on ranks so that a rank is not changed to a higher one by 3 ranks or more, for example. When this limitation is reached, the absolute position (latitude and longitude) is transmitted to the vehicle 110. This prevents unnecessary transmissions between the information center 130 and the vehicle 110.

Figure 15:
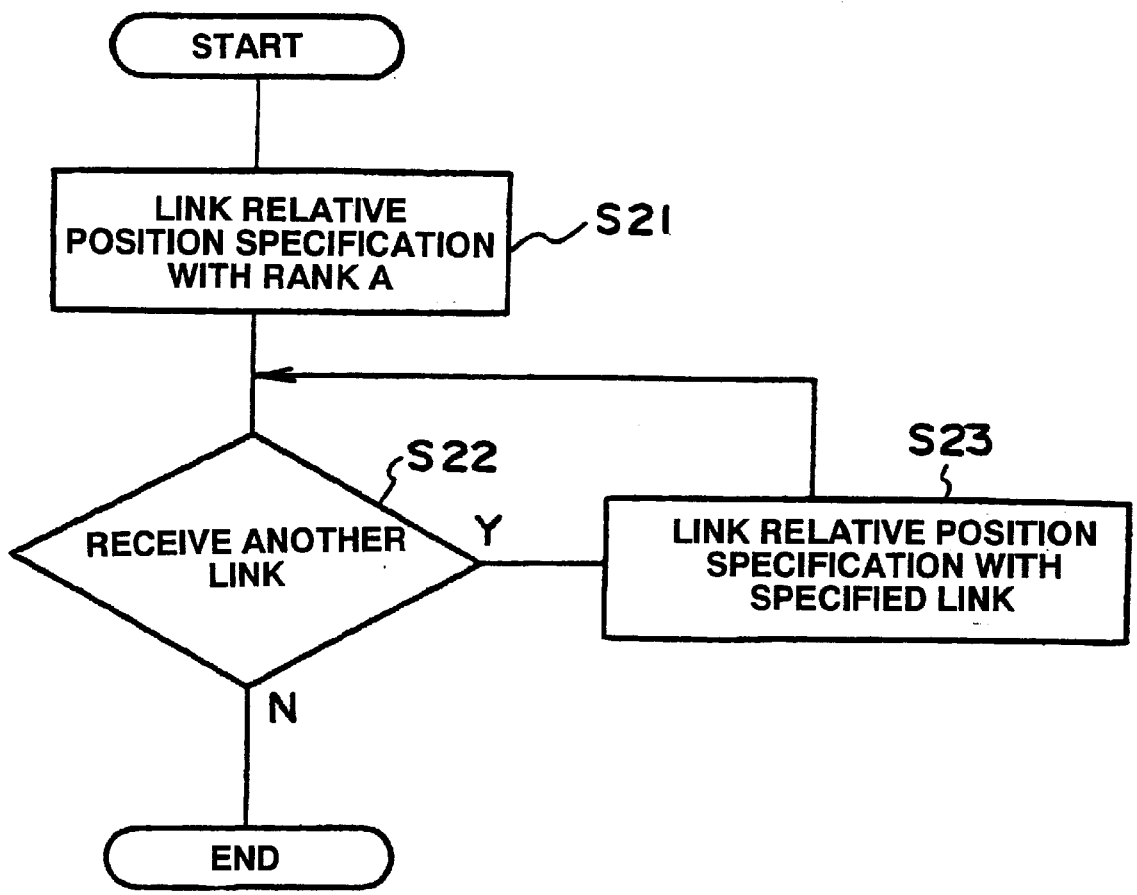
FIG. 15 is a flowchart showing another example of a retransmission procedure for the second embodiment.

When the link used in the relative position specification does not exist, the link to be used at the vehicle 110 can also be specified. Namely, as shown in FIG. 15, the link closest to point P is first used in the information center 130, and the position of point P is relatively specified and transmitted (S21) to the vehicle 110. At this time, the information center 130 also transmits the relative position (latitude and longitude) of point P. If the relative position specification that is received does not exist in the local map database 116, the vehicle 110 searches for a link close to the position from the received absolute position. For example, perpendicular lines are drawn to each link from the received absolute position, and a link can be selected, such as by a method selecting the smallest vector. The link in proximity is transmitted to the information center 130.

After the first transmission, the information center 130 waits for a predetermined time (S22) for another link to be transmitted. When the transmission is received, the link is used to transmit the relative position of point P (S23). The link used in this case was specified at the vehicle 110 and exists in the map database 116 of the vehicle 110. Therefore, the relative position data that was transmitted in S23 can be recognized at the vehicle 110.

Updating of the Map Database

As described above, if the link used in the relative position specification that was transmitted from the information center 130 does not exist in the map database 116 at the vehicle 110, the relative position specification is performed using another link. However, the first link used in the position specification of point P is optimum. Furthermore, to go to point P, it is preferable to pass the first specified link. Thus, it is preferable to provide data on a link that does not exist in the map database 116 of the vehicle 110 in accordance with a request from the vehicle 110 or a second transmission. For example, when the information center 130 provides the data shown in FIG. 16 to the vehicle 110, and the vehicle 110 updates the map database 116 according to this data, the relevant link can be displayed on the display unit 118 in the vehicle 110. Namely, link data is transmitted comprising secondary mesh code, link number, starting point node number and coordinate, end point node number and coordinate, number of complementary points, and coordinate for complementary point (repeated only for the number of complementary points). As a result, the relevant link is defined by a line passing through the complementary points from the starting point to the end point. If this link is not the starting point for the link existing in the map database 16 of the vehicle 110, the data regarding these intermediate links is also transmitted.

In this manner, the map database 116 can be updated by the addition of a new link. This data may be deleted or kept after completion of the drive until point P.

Figures 16, 17:
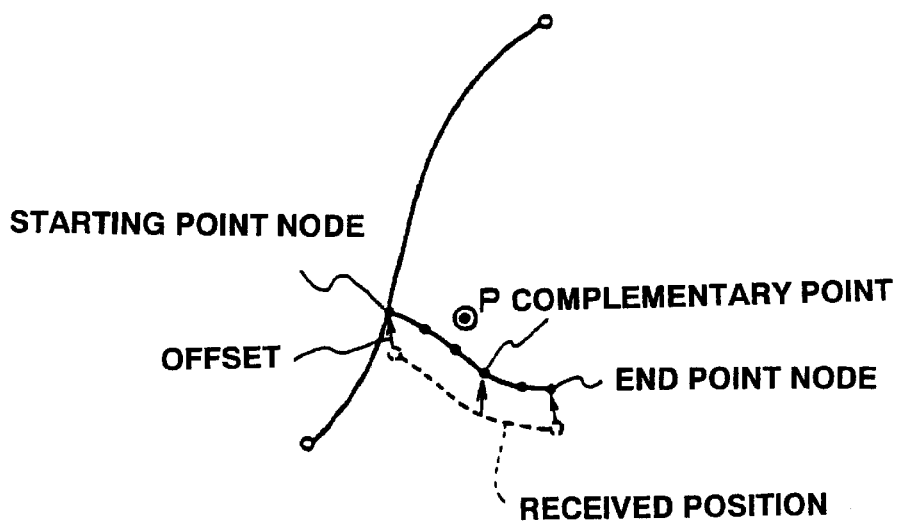
FIG. 16 shows the organization of shape data for a link.
FIG. 17 illustrates correction of a link shape.

If the starting point and end point of the link to be newly updated exists on the link existing in the map database 116, a point specified from coordinates may shift from the existing link. In this case, it is preferable to consider this shifted distance as an offset, as shown in FIG. 17, and to shift the entire new link by the amount of the offset. In this manner, taking the offset into consideration enables a correct positional relationship to be maintained on the local map.

The link to be newly updated may be relatively specified using an already existing link. In this case, the starting point is specified with a distance from the starting point of the already existing link, and the complementary points and end point are specified by a vector from this starting point. In this manner, the data regarding the updated link is set as relative position data so that a correct positional relationship of the link and the peripheral condition is maintained, and data is updated with a correct positional relationship.

Other

In the above-mentioned embodiment, relative position data was used when providing position data from the information center 130 to the vehicle 110. However, when providing position data from the vehicle 110 to the information center 130, it is preferable also to use relative position data. For example, there are cases where it is preferable to specify the destination with relative position data when the vehicle 110 sends a request to the information center 130 for a route search to the destination.

Namely, a map of the neighborhood of the destination is displayed on the display unit 118 of the vehicle 110, and the destination is set by specifying a point on this map. The absolute position (latitude and longitude) of the destination is calculated from coordinate values on the map. However, this absolute position is not necessarily correct. On the other hand, the relationship between the absolute position and the peripheral condition, such as of a road, is extremely accurate at the information center 130. When the absolute position incorporated at the vehicle 110 is recognized at the information center 130, the position may be on the opposite side of the road. Therefore, the final road to the destination may indicate the opposite direction in the route obtained from the route search.

Thus, it is preferable to provide at the navigation controller 112 of the vehicle 110 a transformer for transforming absolute position data to relative position data, and to provide the relative position data (or both types of data) to the information center 130.

The vehicle 110 may provide position data, such as the present position, to the center or to other vehicles, and in this case, it is also preferable to use the relative position data.

What is claimed is:

1. A position information provider system, connecting a terminal and an information center and in which the information center provides position information regarding a specific position to the terminal, comprising:

a center map database, which stores a position regarding a linear landmark including at least a road;

position information generating means for generating position information that includes information regarding the landmark existing in periphery of said specific position that is provided to said terminal, extracted from said center map database, and information regarding a relative position of the relevant position for the landmark in the periphery of said specific position; and transmitting means for transmitting said position information;

said terminal comprising:

a terminal map database in which information on the landmark on a linear map display;

receiving means for receiving information that said information center transmitted;

display position calculating means for calculating a display position on a terminal map of said specific position so that the position of said peripheral landmark that was received on the basis of said received position information matches the position of the landmark in the terminal map database corresponding to the relevant peripheral landmark; and displaying means for displaying the relevant specific position while superimposed on the map on the basis on said calculated display position.

2. The position information provider system according to claim 1 wherein:

the information regarding said peripheral landmark includes shape and type of the relevant landmark.

3. The position information provider system according to claims 1 or 2 wherein:

said terminal transmits the type of terminal map database, which the relevant terminal holds, to the information center; and said position information generating means extracts said peripheral landmark according to the type of terminal map database that was received and generates position information.

4. The position information provider system according to claim 3 wherein:

the peripheral landmark, which said position information generating means extracts, includes the road in accordance with the type of terminal map database, which said terminal holds; and furthermore the information regarding the specific position includes a reference point that is set in advance on said extracted road and detailed route information up to the specific position of information to be provided.

5. The position information provider system as in one of claims 1–4 wherein:

the peripheral landmark, which said position information generating means extracts, is two roads connected to each other and positioned so as to sandwich the specific position of information to be provided.

6. A position information provider system in which terminal and information center are connected by communications and the information center provides position information to the terminal wherein the information center comprises:

the center map database for storing the position of the road network as well as connections of links, which are units forming the road network; and relative positional relationship specifying means for specifying an absolute position with relative position data that represents a relative positional relationship with a close link stored in the center map database;

the terminal comprises:

the terminal map database for storing the position of road network and for storing the road network as connections of links, which are units forming the road network;

the information center transmits a provided specific position to the terminal as relative position data with said link;

the terminal requests retransmission when the link used by the received relative position data does not exist in the terminal map database; and the information center retransmits the relative position data with another link close to the specific position when the retransmission request is received.

7. The position information provider system according to claim 6 wherein:

said center map database stores a rank for each link; and the information center transmits relative position data using a link having a rank higher than that of the link previously transmitted during retransmission.

8. The position information provider system according to claim 7 wherein:

said information center also transmits absolute position data of specific position while transmitting relative position data;

said terminal specifies a link close to absolute position data existing in the terminal map database during retransmission request; and said information center transmits relative position data using a specified link in the retransmission request.

9. The position information provider system according to claim 8 wherein:

the information center transmits data on the shape of a link not existing in the terminal map database to the terminal; and the terminal updates the terminal map database from the data on the shape of the link that was received.

10. The position information provider system according to claim 9 wherein:

the information center uses the data on the shape of the link to be transmitted as relative data using the link existing in the terminal map database.

11. The position information provider apparatus for transforming absolute position data into relative position data comprising:

the map database for storing road network as coordinate values on map associated with absolute values; and transforming means for transforming an arbitrary absolute position into the relative position with the road network.

12. The position information provider apparatus according to claim 11 wherein:

relative position data to be provided regards the position of a facility for which a request was made.

* * * * *